United States Patent [19]

Neuffer et al.

[11] Patent Number: 4,959,808

[45] Date of Patent: Sep. 25, 1990

[54] METHOD AND APPARATUS FOR THE DISTANCE CONTROL OF A POSITIONING DRIVE

[75] Inventors: Ingemar Neuffer, Erlangen; Christian Keller, Nuremberg, both of Fed. Rep. of Germany

[73] Assignee: Siemens Aktiengesellschaft, Munich, Fed. Rep. of Germany

[21] Appl. No.: 182,847

[22] Filed: Apr. 18, 1988

[30] Foreign Application Priority Data

Apr. 18, 1987 [DE] Fed. Rep. of Germany ....... 3713271

[51] Int. Cl.[5] ......................... G01P 15/00; B66B 1/24

[52] U.S. Cl. .................................... 364/566; 364/565; 364/561; 364/174; 318/64; 318/63; 318/61; 187/116; 187/29.2

[58] Field of Search ............... 364/561, 566, 174, 175, 364/565; 318/61, 64, 63; 187/112, 116, 130, 134, 29.1, 29.2, 38, 39

[56] References Cited

U.S. PATENT DOCUMENTS

| | | | |
|---|---|---|---|
| 4,130,184 | 12/1978 | Satoh et al. | 187/118 |
| 4,337,847 | 7/1982 | Schroder | 187/101 |
| 4,351,416 | 9/1982 | Terazono et al. | 187/116 |
| 4,354,576 | 10/1982 | Kajiyama | 187/116 |
| 4,629,034 | 12/1986 | Inaba et al. | 187/116 |
| 4,751,984 | 6/1988 | Williams et al. | 187/116 |

FOREIGN PATENT DOCUMENTS

| | | |
|---|---|---|
| 1756946 | 11/1970 | Fed. Rep. of Germany . |
| 3001778 | 7/1981 | Fed. Rep. of Germany . |

*Primary Examiner*—Gary Chin
*Assistant Examiner*—V. N. Trans
*Attorney, Agent, or Firm*—Kenyon & Kenyon

[57] ABSTRACT

A first acceleration reference value is continuously determined by a nonlinear distance control. In parallel thereto, a second acceleration value is generated by a nonlinear velocity controller. A simple selection criterion that comprises only these two alternative acceleration values engages the second alternative acceleration reference value engagement for run up. The first alternative acceleration reference value initiates the destination braking. The second alternative reference value is used for approaching the destination position. The trip destination and the velocity of the positioning drive can be accommodate inching velocities.

8 Claims, 10 Drawing Sheets

METHOD AND APPARATUS FOR THE DISTANCE CONTROL OF A POSITIONING DRIVE

BACKGROUND OF THE INVENTION

The present invention relates to a method and apparatus for the step, acceleration and velocity control of a positioning drive that has a limited travel distance and a subordinated velocity control. The acceleration, velocity and value of the desired distance of the positioning drive is controlled through the multiple integration in time of a step value. The amplified difference between a desired acceleration value and the time integral of the step value is formed between ID a desired acceleration value and the time integral of the step value which is limited with respect to its maximum absolute value. Such a method is known from German Pat. No. 3,001,778. The desired position can thus be rapidly reached by keeping the boundary positions fixed within predetermined limits and utilizing these positions as long as possible.

SUMMARY OF THE INVENTION

The present inVention simplifies the foregoing method and makes it more flexible with respect to travel behavior. The present invention should permit velocity to be reset in any desired manner during travel. This feature is important, for example, to maintain line related inching velocities. It should further be possible to realize destination changes made during a run.

The present invention comprises a method and apparatus for forming a first alternative acceleration reference value and a second alternative acceleration reference value. The first alternative acceleration reference value is a function of the residual travel distance to a predetermined stopping point using constant deceleration. The second alternative acceleration reference value is used to prevent overshooting the predetermined stopping point. The present invention can also recognize a plurality of stopping points as well as danger points in the path of the positioning drive.

DETAILED DESCRIPTION

Figure 1:
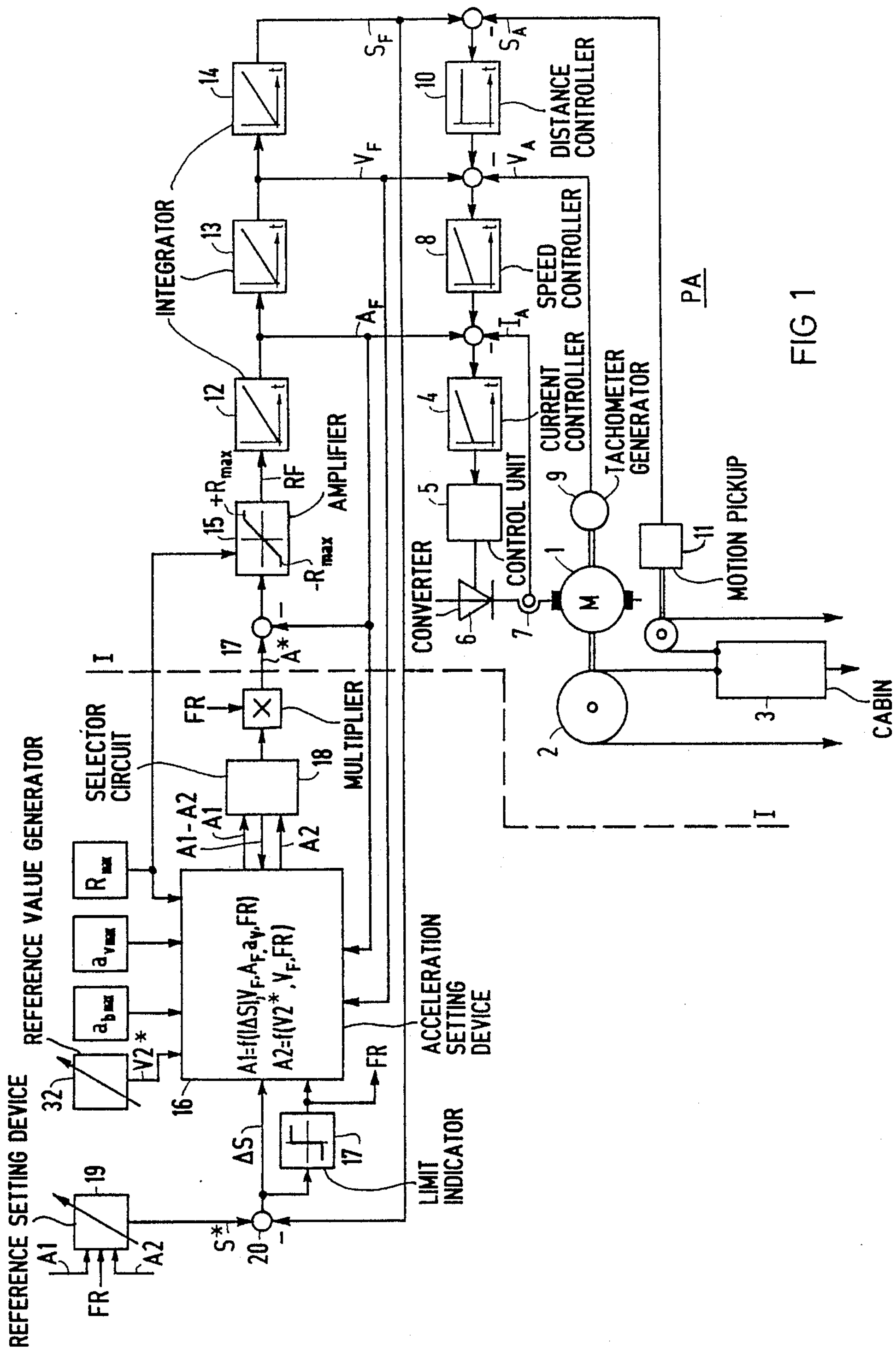
FIG. 1 shows an example of the invention relating to a shaft hauling system.

FIG. 1 shows a positioning drive PA controlled with o an electric motor 1 which moves the cabin 3 of a hoisting or shaft conveyer system via a pulley 2 coupled therewith. The current of the electric motor 1 is controlled with a current controller 4. The converter has an output that controls a converter arrangement 6 through a control unit 5. The actual value $I_A$ of the current controller 4 is obtained with current transformer 7 arranged in an armature circuit. A speed control 8 is superimposed onto a current controller 4. The actual value $V_A$ of current controller 4 is the output signal of a speed controller 8 that has an actual value $V_A$ for a tachometer generator 9 that is coupled to the electric motor. A travel distance controller 10 is superimposed on speed controller 8 and has an actual value $S_A$ from a motion pickup 11. Pulses generated by the rotation of a pulse disc coupled to the cabin act on motion pickup 11.

The positioning drive PA comprises elements 1 to 11. The reference drive PA is set with a reference-value position using a controlled distance reference value $S_F$ and controlled reference values $V_F$ and $A_F$ for the subordinated velocity and current controllers 8 and 4, respectively. The control variables $A_F$, $V_F$ and $S_F$ comprise the output signals of three integrators 12, 13 and 14 that are arranged in series. The positioning drive PA is loaded with the reference value $S_F$ and obtained from the reference values $V_F$ and $A_F$ for the subordinated velocity or current controllers 8 and 4, respectively. One of these values always reaches its maximum value for travel distances larger than a given minimum distance This objective is attained using a reference value S* that prescribes the destination position of the cabin an is compared with the output variable SF of the integrator 14 that forms the desired distance value for the positioning drive PA and is made to coincide with the reference value S* using a nonlinear operating control. The difference ΔS between the destination position reference value S* and the reference value $S_F$ delivered by the integrator 14 corresponds to the remaining distance yet to be travelled to the destination at both the beginning of each travel process and continuously throughout so long as the cabin 3 can follow the current changes of the controlled reference-distance value $S_F$ without appreciable drag error.

The control variable $A_F$ is formed using an acceleration control circuit comprising integrator 12 and a linear high gain amplifier 15. The output signal $R_F$ of amplifier 15 is limited for both polarities to a maximum step value $R_{max}$. The output signal $A_F$ of the integrator 12 corresponds to the acceleration to be set for the drive. Output signal $A_F$ is coupled with negative feedback to the input of the amplifier 15 and simultaneously acts to control the correction value for the acceleration on current control 4. The combination of the amplifier 15 and the integrator 12 represents, for all practical purposes, a startup controller for the acceleration reference value $A_F$. This combination adapts this value to the prevailing acceleration reference value A* with a defined rate of change. This method of indirectly setting the step value eliminates an otherwise necessary determination of the respective switching times for the maximum step values.

The apparatus described so far, which is shown in FIG. 1 to the right of the line I—I, coincides with the state of the art as known from German Pat. No. 3,001,778.

According to the present invention, the acceleration setting device 16 receives the acceleration reference value A*. The acceleration setting device 16 is also supplied the residual distance signal ΔS, the input value $V_F$ for the velocity, the input value $A_F$ for the acceleration, a velocity reference value V2* which can be set as desired, and boundary parameters $R_{max}$ for the step, for the maximum value $a_{b\ max}$ of the acceleration and for the maximum value $a_{v\ max}$ of the deceleration. A travel direction signal FR is made available by a limit indicator 17 as acted upon by the distance difference ΔS. The travel direction signal FR has different polarities for up and down travel, whereby, in conjunction with multipliers, the correct sense of action of the acceleration setting device 16 is ensured for both directions of travel.

The acceleration setting device 16 uses two reference values for the acceleration control circuit. The first acceleration reference value A1 decreases toward the destination and thus decreases the velocity of the positioning drive. The action of this acceleration reference value and a constant delay of the variable $A_v$ prevents the positioning drive from going beyond a point which is ahead of the stopping point set by the reference value S* by a distance of $SZ = a_v^3 . (24\ R^2_{max})^{-1}$. The variable $R_{max}$ represents the maximum permissible step value.

The second acceleration reference value A2, alternatively presented by the acceleration reference setter 16 can bring the positioning drive to a setable velocity drives V2* without overshoot. The boundary value for the acceleration here are $a_{b\ max}$ and for the deceleration $a_{v\ max}$, respectively.

The method according to the present invention lets he start up and, optionally, subsequent travel take place at a constant velocity under the action of the alternative setting acceleration value A2. The setable velocity V2* is, for example, set to the value $V_{max}$ when the destination directed delay is to occur so as to control the first alternative acceleration reference value A1. The control in the last part of the travel homes in on the stopping point under the control of the alternative setting acceleration reference value A2. In the homing phase, the first alternative acceleration reference value is replaced if the distance to be traveled is four times as large as the travel distance ŚZ. The replacement of the second acceleration reference value A2 for destination braking by the first acceleration reference value A1 can occur in a distance and velocity dependent manner in accordance with the known laws of kinematics. The replacements are determined by a selection circuit 18.

The set velocity reference value V2* can be varied s between zero and a maximum value $V^*_{max}$ after start up. This feature can be important for observing technology-related inching distances in starting or approaching the destination position, or for limiting the travel distance. Position reference value s* also can be varied if required such as when the initially planned course of travel changes during the travel.

The formation and selection of the two alternative acceleration reference values A1 and A2 requires a number of continuous arithmetic operations. The time required for these operations can be greatly reduced using a variant of the method according to the invention described below using very simple selection criteria. In algorithmic form, the course of the method can be described in conjunction with FIG. 1 as follows:

$$FR = \sin(\Delta S) \quad \begin{cases} FR = 1 \text{ signifies upward travel} \\ FR = -1 \text{ signifies downward travel} \end{cases} \tag{1}$$

$$a_b := a_b + \text{ASTOP} \cdot \frac{\Delta t}{T} \cdot a_{bmax} \text{ where } O \leqq a_b \leqq a_{bmax} \tag{2}$$

$$a_v := a_v + \text{ASTOP} \cdot \frac{\Delta t}{T} \cdot a_{vmax} \text{ where } O \leqq a_v \leqq a_{vmax} \tag{3}$$

$$V1^* = \sqrt{2 \cdot a_v \left(|\Delta|S + (4 \cdot (FR \cdot A_F + a_v)^3 - a_v^3) \cdot \frac{1}{24R^2_{max}}\right)} \tag{4a}$$

-continued $$A1 = \sqrt{(V1^* - FR \cdot V_F) \cdot 2 \cdot R_{max}} - a_v \tag{4b}$$

$$\text{If } A1 < O \text{ then } V2^* = 0 \tag{5}$$

$$A2 = \sin(v2^* - FR \cdot V_F) \cdot \sqrt{|V2^* - FR \cdot V_F| \cdot 2 \cdot R_{max}} \tag{6}$$

$$\text{where } -a_v \leqq A2 \leqq a_b$$

$$\text{IF } \sin(A1)\cdot(A1-A2) \leqq 0 \text{ then } A^* = A1 \cdot FR \tag{7a}$$

$$\text{IF } \sin(A1)\cdot(A1-A2) > 0 \text{ then } A^* = A2 \cdot FR \tag{7b}$$

$$\text{IF } A1-A2 < 0 \text{ then ASTOP} = 0 \tag{8a}$$

$$\text{IF } A1-A2 \geqq 0 \text{ then ASTOP} = 1 \tag{8b}$$

Accordingly, the travel direction signal FR is formed from the difference ΔS between the reference value S* that is furnished by reference value setting device 19 and the control reference value $S_F$ of the positioning drive PA. Positioning drive PA feeds the reference acceleration setting device 16 through limit indicator 17 according to Equation (1). The travel direction signal is a positive signal having the magnitude 1 for upward travel and a signal of the same magnitude with negative polarity for downward travel. As long as a signal ASTOP is set to the value 1 at the beginning of the start and retains this value, limit values for the acceleration $a_b$ and the Value zero fixed for the deceleration $a_v$ increase almost linear)y in time from an initial fixed value of zero over a very short time Δt. The increases are continued until either the limits have reached their maximum permissible constant values $a_{b\ max}$ and $a_{v\ max}$, respectively, or the above-mentioned signal ASTOP vanishes, i.e., becomes zero, whereupon the limits retain their previous values. According to Equation (4a), a reference value V1* is determined from the absolute value of the remaining travel distance ΔS, the controlled velocity reference value $V_F$, the controlled acceleration reference value $A_F$, the limit value $a_v$ reached for the deceleration, the travel direction signal FR and the limit value $R_{max}$ for the step. The first alternative acceleration reference value A1 is determined according to Equation (4b). Treating the variable ΔS as the difference between a distance reference value S* and a value practically corresponding to a travel distance reference value, then Equation (4A) describes a specific non-linear distance control processing for a distance difference. The output variable V1* forms the reference value for a likewise non-linear velocity controller that is subordinated to it (Equation 4B). The actual value of the controlled velocity reference value $V_F$ is the pilot variable and is fed to the limit controller together with the accelerating limit value $a_v$.

Equation (6) shows hoW to determine the second alternative acceleration reference value A2. This value must not exceed the limits for the deceleration $a_v$ for the acceleration $a_b$. Equation (6) is again executed in a nonlinear controller which processes the difference between a velocity reference value V2* and an actual value in the form of the controlled velocity value V2* to obtain a desired value that can be as large as $V_{max}$. The velocity thus approaches that of the positioning drive. If the first alternative acceleration reference value A1 becomes negative, the velocity reference value V2* is set to zero according to Equation (5) during the braking phase after startup.

Equations (7a) and (7b) determine which of the two alternative acceleration reference values A1 and A2 becomes the reference value A*. The acceleration control circuit comprising the amplifier 15 and the integrator 12 supplies selection device 18 in accordance with the condition Equations (7a) and (7b) as a function of the weighted difference A1–A2 of the two alternative acceleration values formed by the sine function. To form this simple selection criterion, the two alternative acceleration reference values A1 and A2 must be sufficient so that no distance or velocity monitors are necessary. According to Equations (1) to (7), at the beginning of the travel, i.e., on starting, the second alternative acceleration value A2 becomes effective. The first alternative acceleration reference value A1 then takes control at the beginning of the destination directed braking phase. At the end during the arrival at the destination without overshoot according to Equation (6), the condition V2*=0 is again controlled by the second alternative acceleration reference value A2.

Equations (8a) and (8b) represent the conditions under which the linear increase over time of the acceleration limits $a_b$ and the deceleration a is stopped. This stop is important to obtain small displacements. It is no longer necessary to differentiate between large and small distances. Rather, a uniform travel strategy always applies.

To practice the method according to the present invention using a digital computer, a continuous determination of the two alternative acceleration values occurs in the order of Equations (1) to (8b). The decision as to which equation to use starts with the applicable alternative acceleration reference value. The individual controlled reference values $A_F$, $V_F$ and $S_F$ are prepared for acceleration, velocity and distance. Next begins a new computing cycle for Equations (1) to (8b) as well as a new set of controlled reference values. The computer cycle time T can be chosen rather small, for example, up to 5 msec with the processing speeds of modern microprocessors, to obtain a quasi-continuous position control using only a stepwise operating computer.

Figure 2A:
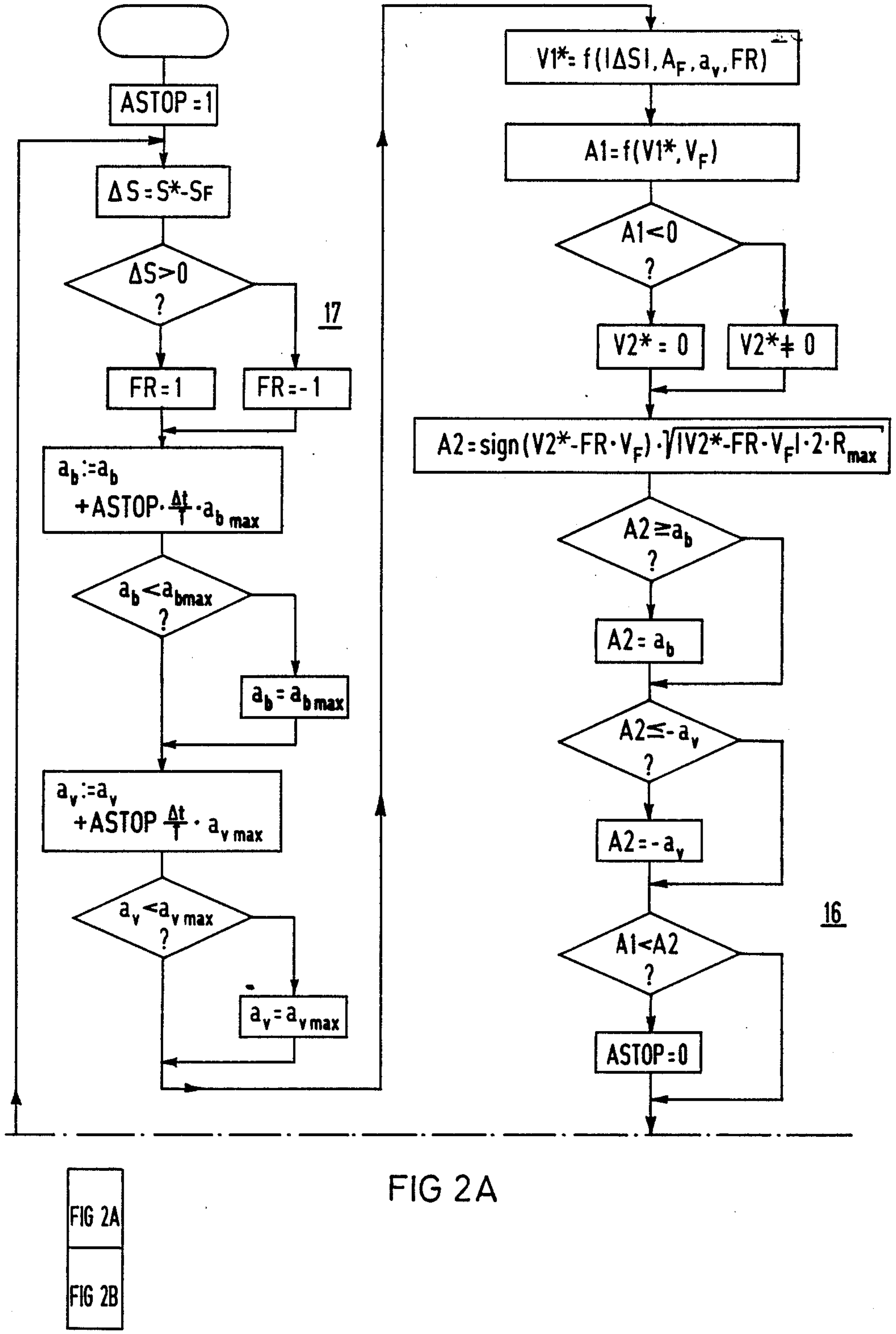
FIGS. 2*a* and 2*b* show a flow chart of the method according to the invention.
Figure 2B:
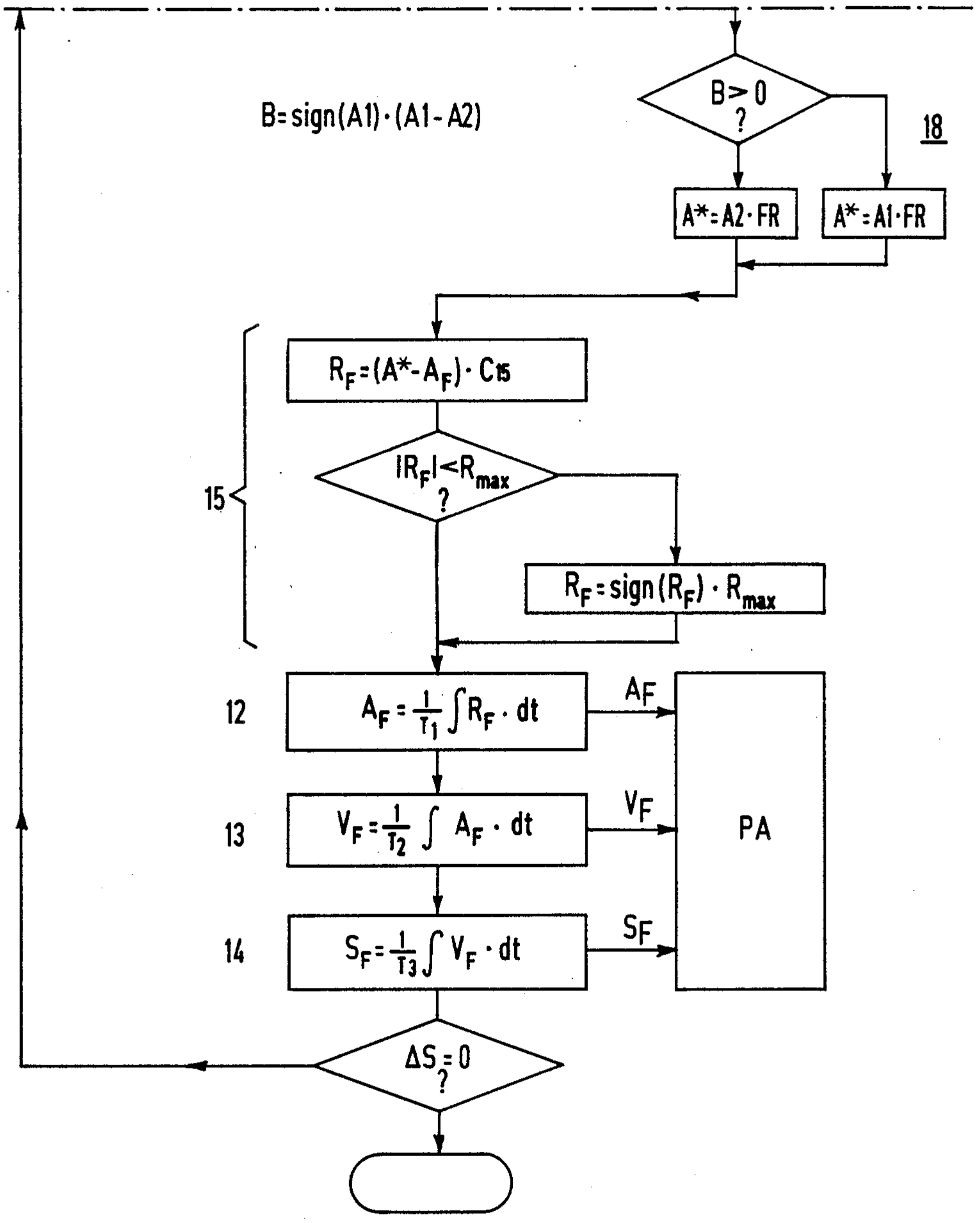

The process plan according to FIGS. 2*a* and 2*b* show the described algorithmic method resolved into its individual steps. Each rectangular functional block gives the state of the variables in question. The variable correspond to the states described by the respective preceding functional blocks. The diamond shaped functional blocks represent a function selected by the procedure. The path designated "yes" corresponds to the condition given when this functional block is met, whereas the path designated "no" corresponds to the path taken if the condition is not met. The reference symbols given next to the functional blocks refer to the elements of FIG. 1 that have the same designation.

Starting at the beginning, the signal ASTOP is first set to 1. The distance reference value S* corresponds to the stopping point provided. The value $S_F$ corresponds to the distance action value $S_A$ of the positioning drive PA. The distance control deviation ΔS corresponds to the running or residual path. Once these variables are formed, the polarity of the travel direction signal FR is determined. Next, the limiting values for the acceleration $a_b$ and $a_v$ for the deceleration is linearly increased in time. A subsequent test is always performed to determine whether the end values $a_{bmax}$ or $a_{vmax}$ have been reached. The two alternative acceleration reference values A1 and A2, corresponding to Equations (4)–(6) are then computed. The second alternative acceleration reference value A2 is tested to determine whether it is within the limit for the acceleration $a_b$ and the deceleration $a_v$ respectively. An additional test is made to determine whether the former value of the signal ASTOP can be retained in the next computing cycle, i.e., whether the linear increase of these values with time is to be broken off in the case that A1 has become smaller than A2. Thus, the functions to be related to the acceleration setter 16 are treated.

Next, the acceleration reference value to be used is selected. A function is assigned to the selection circuit 18 shown in FIG. 1 as described by Equations (7a, b). A variable sign (A1) is formed which has the value +1 if the polarity of A1 is positive, and the magnitude −1 if the polarity is negative according to the sign of the first alternative acceleration reference value A1. The variable B therefore represents the weighted difference between the first and the second alternative acceleration reference value and has the polarity of the first alternative acceleration reference value. Either the first or the second alternative acceleration reference value becomes the reference value A* of the acceleration control circuit depending on whether this quantity B is greater or less than zero.

The acceleration reference value A*, once selected, becomes the input to the acceleration control circuit comprising amplifier 15 and integrator 12 as shown in FIG. 1. The symbol C15 represents high gain amplification of the proportional amplifier 16. The resulting controlled step value is optionally limited to the maximum step value $R_{max}$.

The value of the controlled step value $R_F$ thus obtained is integrated three consecutive times. The intermediate values of the control acceleration reference value $A_F$, the controlled velocity reference value $B_F$ and the distance reference value $S_F$ are fed to the positioning drive PA. The end of a computing cycle is formed by interrogating to determine whether the distance difference S has become zero, i.e., determining whether the predetermined stopping point has been reached. If no, the distance difference does not disappear and a new computing cycle begins with the previous value for the controlled distance reference value $S_F$.

A digital computer that is programmed in accordance with this timing plan can function as the elements 12 to 20 of FIG. 1. The present state of the art makes it feasible to simulate the control circuit elements 4, 5 and 8 to 11 with an appropriate software program. In particular cases, however, it may be advisable to use discrete analog components for at least some parts of the method according to the present invention.

Figure 3:
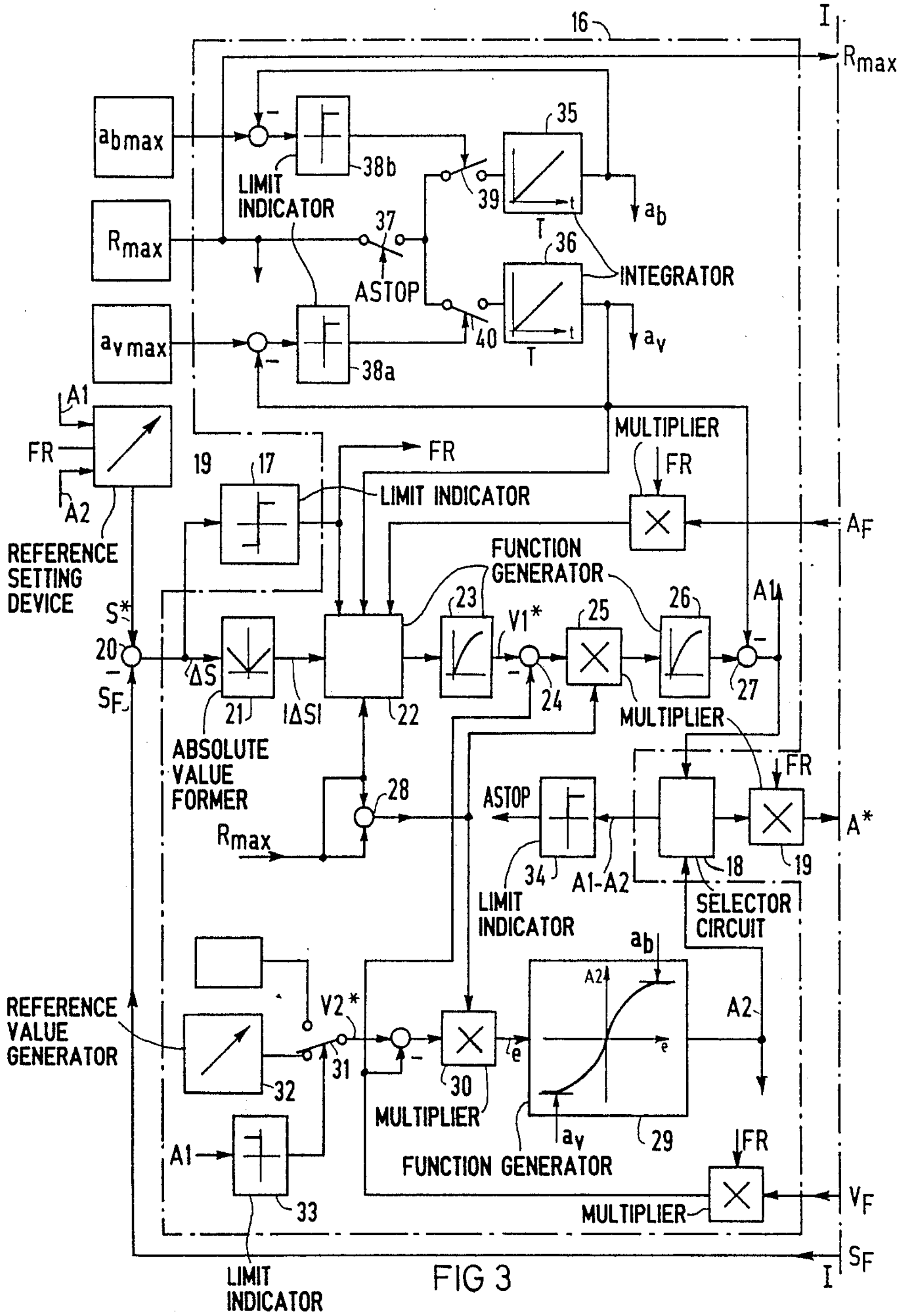
FIGS. 3–6 show hardware for realizing individual steps of the method.

FIG. 3 shows an embodiment that uses discrete components in hybrid technology, i.e., a combination of analog and digital components. FIG. 3 shows that part of a system that is located to the left of line I—I. The switches preferably comprise electronic switching members such as FET transistors unless shown to be different. The switches are presumed to be actuated by a digital H-(high) signal of positive polarity.

Mixer 20 can select a difference between a reference value S*, set as desired to correspond to the desired stopping point, and the control distance reference value $S_F$ which corresponds for all practical purposes to the instantaneous position of the cabin 3. The difference signal thus formed is fed to an absolute value former 21 provided in the acceleration setting device 16 as well as to the travel direction indicator 17. The travel direction indicator 17 comprises a known electronic comparator circuit that delivers a constant d-c voltage signal. A value of +1 for the voltage signal is a positive input signal that indicates upward travel. A constant signal of the magnitude −1 is a negative input signal and represents downward travel. Travel direction signal FR assures that the sense of the correction action of the control device according to the invention for both directions of travel.

The output signal of the absolute value former 21 comprises the absolute value of the residual distance ΔS and is fed to a function generator 22 which, together with the travel direction signal, acceleration limit $a_v$, the controlled acceleration reference value $A_F$ and the maximum step value $R_{max}$ form a function corresponding to the radicand, i.e., the expression under the root sign of Equation (4a). This function can be readily produced using common components of analog computer technology such as multipliers, amplifiers and mixers. The output signal of this function generator is fed to a root taking function generator 22. A mixer 24 subtracts from the output signal of generator 22 a value corresponding to the control velocity reference value $V_F$. A further mixer 28 doubles the value $R_{max}$ corresponding to the control velocity reference value $V_F$. A further mixer 28 doubles the value $R_{max}$ corresponding to the maximum step. A multiplier 25 multiplies the product by the output signal of the mixer 24. A further root taking function generator 26 processes output of the multiplier 25. This output feeds a mixer 27. The first alternative acceleration reference value A1 according to Equation (4b) decreases by the acceleration limit $a_v$. The arrangement of the elements 20 to 23 shows the structure of a non linear distance control. Output V1* forms the reference value for a velocity control 26 that is subordinated to it and is likewise non linear. Selection circuit 18 obtains the first acceleration reference value A1 and is further subordinated to non linear velocity control 26.

The acceleration control has the reference value A* as is shown by comparison with thee arrangement shown in FIG. 1. A further root taking function generator 29 generates the second alternative acceleration reference value A2 as an output signal. The input signal of generator 29 comprises the different between a predetermined velocity value V2* and the controlled reference value $V_F$ increased by the factor $2.R_{max}$ with a multiplier. The output variable of the root taking function generator 29 is limited, for positive polarity to the acceleration limit value $a_b$. For negative polarity, the output of generator 29 is limited to the deceleration limit $a_v$. A suitable reference value generator 32 obtains the predetermined velocity value V2* with switch 31 positioned as shown. Generator 32 may comprise a potentiometer connected to a constant voltage source. The switch 31 has the position shown if first alternative acceleration value A1 is greater than zero. The switch 31 is actuated if the first alternative acceleration reference value becomes smaller than zero so that the value zero is set at the velocity value V2*. FIG. 1 shows that the positioning drive is subjected to the action of a non-linear velocity controller comprising the function generator 29 if the second alternative acceleration reference value A2 is chosen by selector 18. The reference value of generator 29 comprises the velocity value V2*. The latter can be varied during travel by arbitrary actuation of the reference value generator 32. Velocity value V2 is set to zero when a negative acceleration, i.e., deceleration, is demanded in the acceleration reference value Al which is engaged by actuation of the switch 31 by the output signal of a limit indicator 33. The second alternative acceleration value is thus prepared to assume the control in the final phase of the subsequent arrival.

Selector circuit 18 now executes a decision in accordance with the conditions given by Equations (7a) and (7b) as to which of the two available alternative acceleration reference values A1 or A2 engages the acceleration control circuit. The difference between the first and the second acceleration value must be formed for this purpose among others. This difference signal A1–A2 is also used to generate the ASTOP signal. The ASTOP signal is furnished via a limit indicator 34. The run up, begun by the start of two integrators 35 or 36 that furnish the acceleration limits $a_b$ and $a_v$, is then interrupted. During the start, $a_b = a_v = 0$, and, consequently, Equations (4b) and (6) require that the first alternative acceleration value be larger than the second alternative acceleration value. The signal ASTOP is therefore an H-signal that actuates switch 37 by bringing it into its closed position. The output signal of the limit indicators 38a and 38b likewise has an H-signal at the start that actuates switches 39 and 40. The output signals of the integrators 35 and 36 begin to increase linearly with time starting from the value zero. This change persists until either the output signals $a_b$ and $a_b$ reach the preset maximum values $a_{bmax}$ and $a_{vmax}$ or the signal ASTOP first becomes zero. In both cases the connection between the voltage source designated with $R_{max}$ and the inputs of the integrators 35 and 36, respectively, is interrupted by opening one of the switches 37, 39, or 40.

Figure 4:
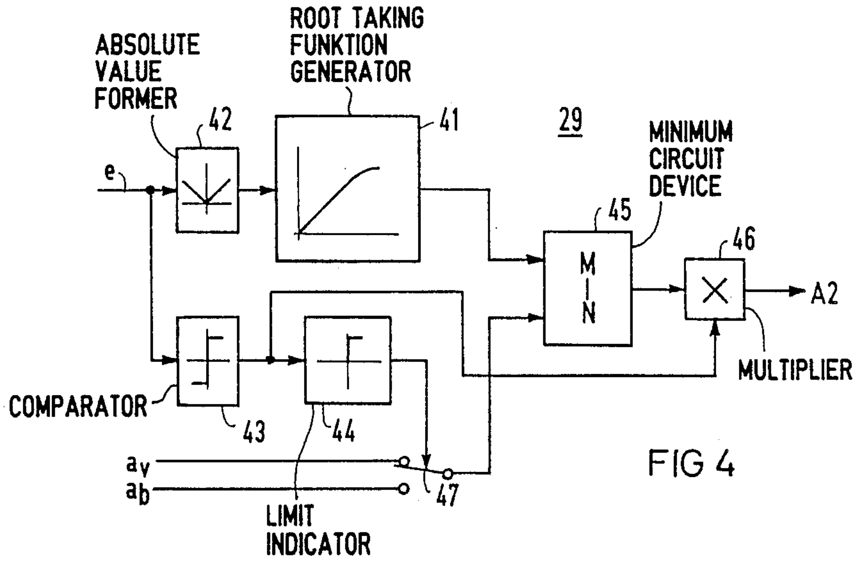

FIG. 4 shows an advantageous embodiment of the function generator 29 with its driving limits fixed by the limit values $a_b$ and $a_v$. Function generator 29 must be suitable for processing input signals 3 of either polarity. However, a relatively simple root taking function generator 41 is used in the arrangement shown in FIG. 4, in which the generator only has to form the square root from a positive input variable. Its input is connected to the output of an absolute value former 42. The input variable e is acted on by the output of absolute value former 42 and therefore may have either polarity. The input variable e is also fed to a comparator 43 that then generates a signal of magnitude +1 if the input variable has positive polarity or a signal of the magnitude −1 if the input variable e has negative polarity. Comparator 43 thus acts as a polarity generator and is equal in function to the travel direction setter 17. The output signal of the polarity setter can cause actuation of a switch 47 via a limit indicator 44. A signal corresponding to the limit value for the acceleration $a_b$ is connected through the input of a minimum circuit device 45. If input signal e is negative, the output signal of the limit indicator 44 has the value zero and brings the switch 47 into the position shown. The limit value for the deceleration $a_v$ then goes to the input value of minimum circuit 45. The other input of the minimum circuit 45 is connected to the output of the root taking function generator 41. The minimum circuit passes the smaller of its positive input signals. A multiplier 46 interlinks the minimum circuit with the output signal of the polarity generator 43 so that the output signal A2 is always given the same polarity as the input signal e. The root taking function shown in the block symbol 29 of FIG. 3 as located in the first and third quadrant can be used with the apparatus shown in FIG. 4. However, a simple function generator is used for the first quadrant.

Figure 5:
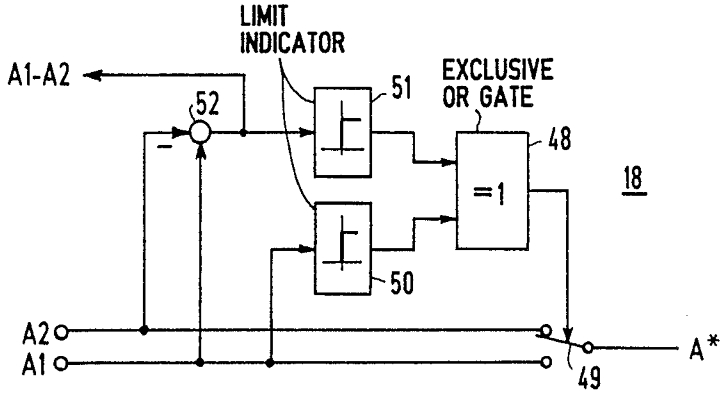

FIG. 5 shows an embodiment of the selection circuit 18 for the two alternative acceleration reference values A1 and A2. The selection function defined in Equations (7a) and (7b) requires the use of polarity transmitters for the sign function and multipliers for interlinking with the difference A1–A2 if these equations are translated directly into discrete components. According to FIG. 5, however, the selection function can avoid multipliers and use comparatively simple components. The selection between the two alternatively provided acceleration reference values A1 and A2 is done using the output signal of an Exclusive-OR gate 48. If the output of the Exclusive-OR gate 48 carries an H (high) signal, then the s switch 49 is actuated so that the previously active alternative acceleration reference value A2 is relieved. Then the alternative acceleration reference value A1 is brought into action as the acceleration reference value A*. Alternatively, the output of the Exclusive-OR gate 48 can carry a L (low) signal so that switch 49 is in the position shown in FIG. 5. The inputs of the Exclusive-OR gate are connected to the output of two limit indicators 50 and 51. The limit indicator 50 is acted on by the alternative acceleration reference value A1 and carries an H signal if the alternative reference value A1 has positive polarity. The same applies to the limit indicator 51 with respect to the polarity of the input signal comprising the difference between the first and the second alternative acceleration reference values. This difference between the reference values is formed in a mixer 52. Thus, an H signal is generated at the output of the limit indicator 51 if the difference A1–A2 has positive polarity, i.e., if Al is larger than A2. An Exclusive-OR gate carries an H signal at the output only if both inputs carry different signals. The arrangement shown in FIG. 5 carries out exactly the selection function shown in Equations (7a) and (7b) for the given mode of operation.

Stringent requirements must be met, particularly relating to the flexibility of the travel program, in the case of passenger elevators if individual desires of the passenger are to be taken into consideration after the start of the trip. This can be achieved with a variant of the method which comprises the following: in the case of farther removed trip destinations, a distance reference value is always set initially which corresponds to the nearest stopping point. This value is checked shortly before the first alternative acceleration reference value would intervene for a destination related stop. This stopping point determines whether a stop is actually to be made, i.e., whether a farther removed stopping point is to be approached instead in the absence of the desire for a stop expressed up to that time. The distance reference value would then be increased by a value corresponding to the next stopping point. The distance reference value is therefore increased, if required, at each individual possible stopping point until it corresponds to the desired destination. These incremental increases in the reference value have no effect on the course of the trip. The trip is the same as if the desired reference value had been set immediately at the start.

The stepwise increase of the distance reference value has particular importance in unmanned traction drives such as suspension railroads. In this instance collision-prone sections, such as switches or crossings, could be provided as possible stopping points to be approached by the positioning drive. The system is regularly prepared to stop ahead of these danger points and to continue its travel without stopping or delay only if a "clear" signal for this danger point is present.

Figure 6:
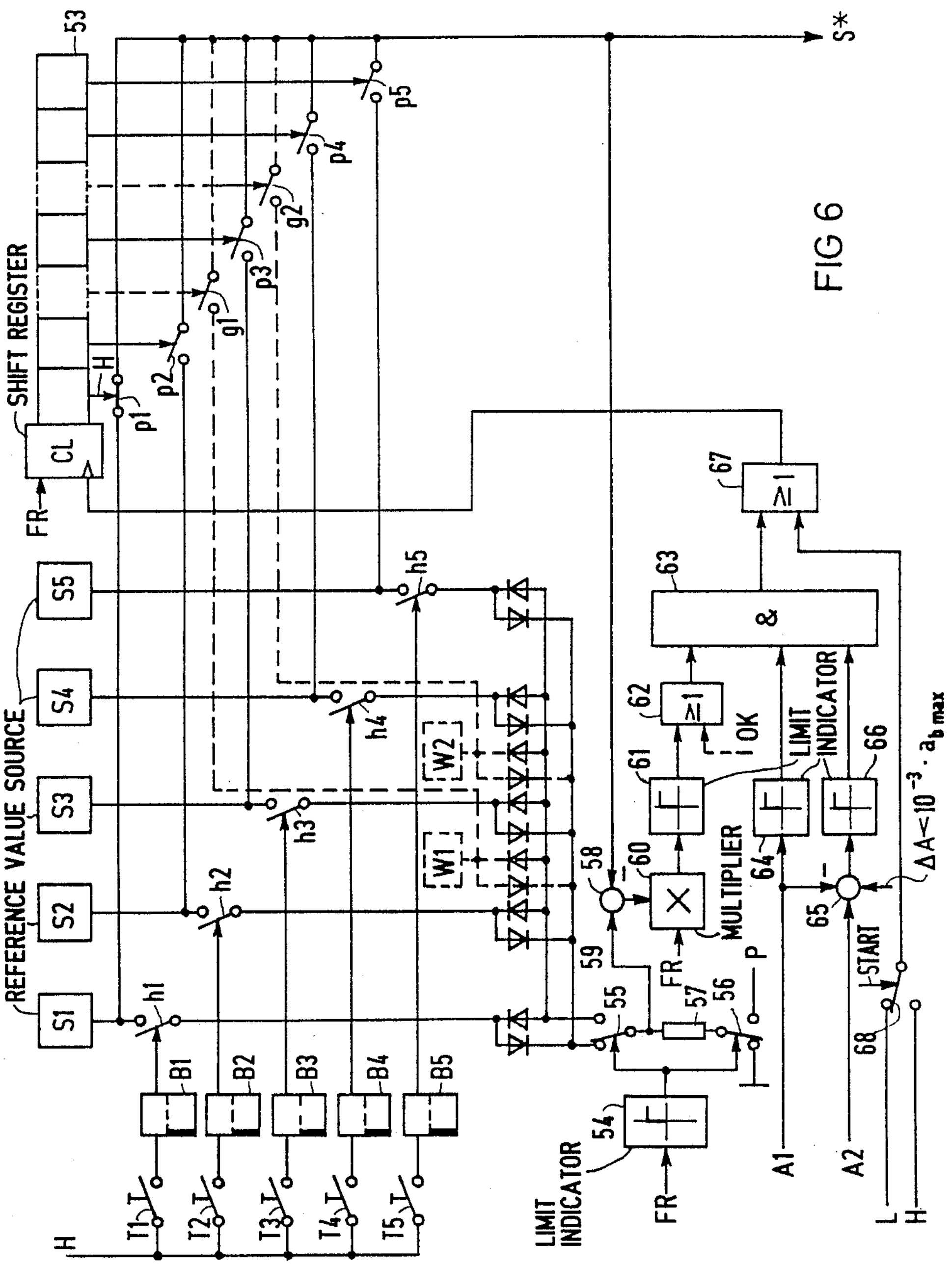

FIG. 6 shows an embodiment of a distance setter 19 for the difference reference value S* with which such a stepwise reference value change can be made while being influenced by the two alternative acceleration reference values A1 and A2. The embodiment relates to a passenger elevator system having, for example, five stopping points corresponding to five stories. Accordingly, five reference value sources S1 to S5 are provided, the potentials of which can be delivered using switches P1 to P5. The switches can be actuated by the individual stages of a shift register 53 as the reference value S*. A shift register is a device in which the signal state of a cell is passed on or shifted to the adjacent cell after the arrival of a signal at the input CL.

In the example shown in FIG. 6, the shift register 53 is in the state in which its outermost cell to the left carries an H-signal at the output signal and has thereby actuated the switch p1 assigned to it. The reference value S* as at the output consequently appears. The value S1 would correspond to the lowest story. For upward travel, the travel direction signal FR is an H signal so that the next positive pulse arriving at the input CL, i.e., a change from the L to the H signal, allows the H signal of the outermost cell of the shift register 53 at the left to travel the right. The switch P2 is closed while the switch P1 is opened. Each pulse arriving at the input CL causes the H signal to travel one cell further to the right. The reference values S1 to S5 are thus delivered sequentially as the actual reference value S*.

If the travel direction signal has the value $-1$, representing here downward travel, the shift register 53 is arranged so that the H signal of the individual cell is always passed on to the adjacent cell to the left. Registers that shift the information as desired to the right or left are known per se. A number of selection keys T1–T5 can set bistable multi-vibrators B1 to B5. The trip destination to be approached can thus be stored. The selection keys are arranged either in the conductor's cabin or are stationery. Operating the keys T1 to T5 assigns switches h1 to h5 to the bistable multi-vibrators B1 to B5 to be actuated. The reference value sources S1 to S5 can thus be connected to a diode selection circuit. The potentials of the reference value sources have $S5>S4>S3>S2>S1>0$. The position of the switches 55 and 56 can be simultaneously actuated by the travel direction signal FR via a limit indicator 54. The diode selection circuit is configured either as a minimum selection circuit or as a maximum selection circuit.

In FIG. 6, the switches 55 and 56 are shown in the unactuated state which they occupy during downward travel. The diodes are here connected to each other at their cathodes via a resistor 57 to a chasis or reference potential. A maximum selection circuit is configured to allow the trip destinations stored with the bistable multivibrators B1 to B5 to become active at the input of a mixer 58. The reference value potential is then highest. Conversely, the travel direction signal FR assumes the value 1 for upward travel and thereby actuates switches 55 and 65. The diodes are then connected to each other with their anodes via the resistor 57 to a positive d-c voltage P. The d-c voltage P has a positive potential that is higher than the highest voltage of the reference value potential, S5, corresponding to the most distant stopping point. A minimum circuit is thus configured which allows the stopping point potential that has the smallest value to be connected to the mixer 58. The second input of the mixer 58 is acted upon by the running reference value signal activated by one of switches P1 to P5. The output of the mixer 58 is interlinked via a multiplier 60 to the travel direction signal FR and to a limit indicator 61. The output of indicator 61 acts on AND gate 63 Via an OR gate 62. A second input of AND gate 63 is connected via a further limit indicator 64 to the first alternative acceleration reference value A1. A third input of the AND gate 63 is acted on by the output signal of a mixer 65 via a further limit indicator 66. Mixer 65 forms the difference between the second and the first alternative acceleration reference values. To this difference is added a small value A that is smaller than one-thousandths of the maximum limit value $a_{bmax}$ for the acceleration. The output of the AND gate 63 acts via an OR gate 67 of the input CL of the shift register 53. A second input of the OR gate 67 can be connected with a switch 68 that can be actuated by a start signal connected to a voltage source supplying the H-signal.

The operation of the apparatus shown in FIG. 6 is described below.

The positioning drive is presumed to be at the stopping point assigned to the reference value S1. The fourth story is first chosen as the destination by actuating the key T4. The signal START actuates switch 68 so that the shift register advances by one step. The reference value S2 is set for the positioning drive as the reference value S* by closing the switch p2. The travel direction signal FR has the value 1. Switches 55 and 56 are therefore in a position, not shown, in which a minimum circuit is configured. The positioning drive now starts to move in the direction toward the stopping point according to the reference value S2. Shortly after the start of travel, the stopping point according to the reference value S3 is additionally chosen by actuating selection key T3. This key, however, initially has no further consequence for the travel behavior. In the course of approaching the nearest stopping point according to the reference value S2, activated by the state of the shift register 52, destination braking would be initiated if, with the first alternative acceleration reference value is positive, the difference between the second alternative acceleration reference value and the first alternative acceleration reference value becomes negative. Shortly before this condition occurs, a short time is determined by the small additional value ΔA so that two of the three AND conditions of the AND gate 63 are met. If at this point in time the third AND condition was fulfilled, a shift signal for the shift register 53 would be generated. This signal would increase the reference value and consequently prevent the activation of the destination braking. The third condition comprises an H-signal of the limit indicator 61. It is therefore possible to check whether there is a requirement to advance further, i.e., an increase of the reference value, or whether the drive is to be brought to a standstill at the stopping point S2.

The reference value increases simultaneously with the suppression of destination braking if the smallest stored stopping point is larger than the instantaneously read out reference value S*. In this case, the output signal of the mixer 58 becomes larger than zero. The limit indicated 61 then responds with an H signal at its output for upward travel. The corresponding value is then stored in a minimum circuit corresponding to the reference Value S3 as the next stopping point. The destination braking with respect to the stopping point S2 is suppressed by advancing the stepping mechanism 53 and the stopping point S2 is passed over. If the positioning drive is between the stopping point S2 and S3, the output signal of the mixer 58 has an L (low) signal. A further advance of the stepping mechanism 53 is prevented and the positioning drive comes to a standstill at the stopping position S3. After a repeated start, this cycle of increasing the reference value as required is continued until the positioning drive is brought to a standstill at the next stored stopping point.

Downward travel, i.e., movement from the stopping point S5 to S1, involves a similar set of conditions. As already mentioned, a maximum circuit is configured for this purpose to bring the largest of the stored reference value potentials to line 59 which is connected to the mixer.

The travel path of an unmanned traction drives has certain danger points such as switches and crossings that may require an emergency stop. FIG. 6 shows these danger points as extensions drawn as broken lines. For example, two additional reference values (W1 and W2) between the normal stopping points are permanently fed into the maximum or minimum circuit. Corresponding steps of the shift register 53 are read out these reference values. A stop at these points is first programmed and then cancelled if a release signal OK is applied to the second input of OR 62.

Figure 7:
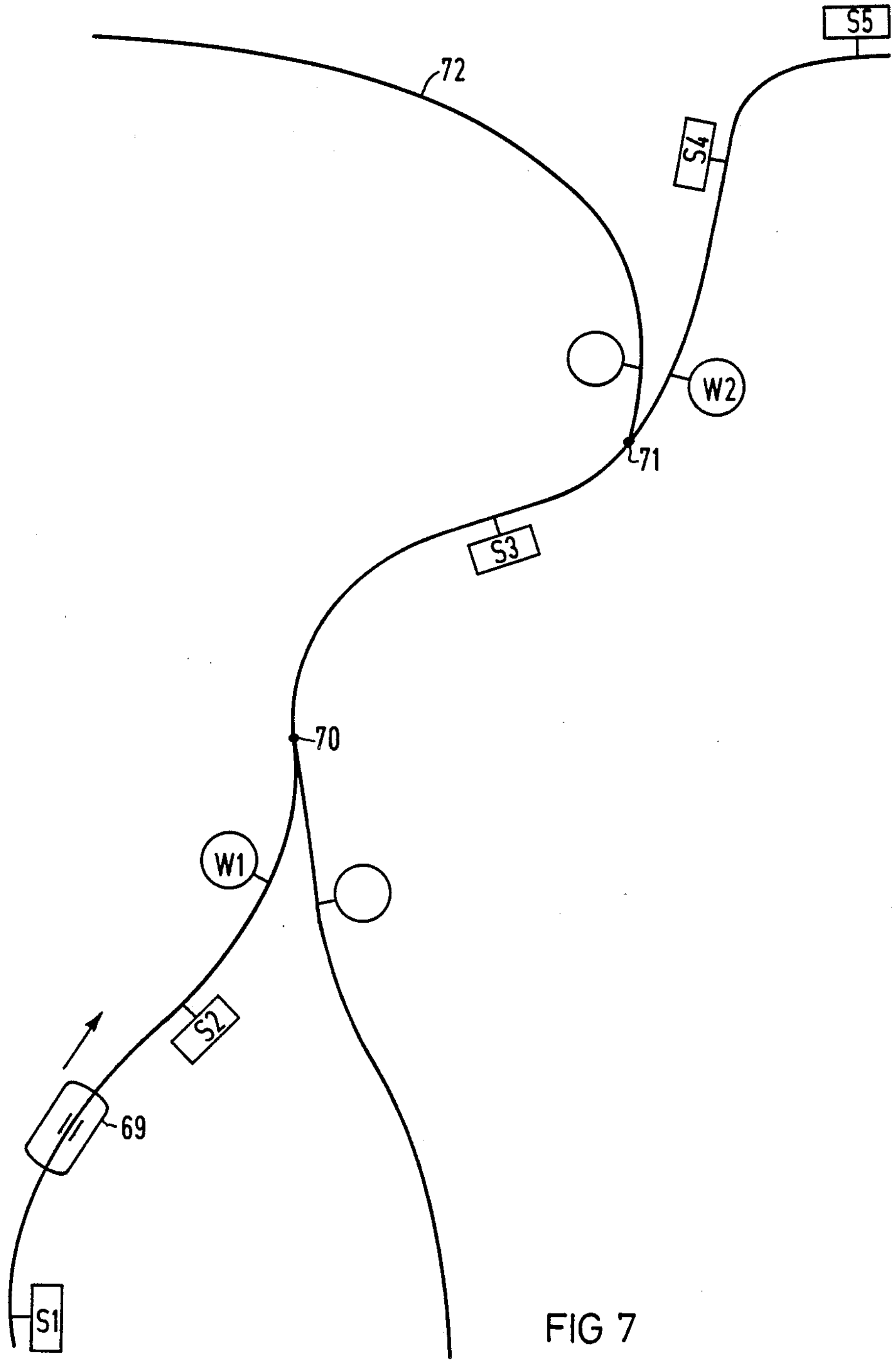
FIG. 7 shows a line arrangement for an overhead conveyer.

FIG. 7 shows the line control for a suspension railroad (H-railroad) that uses the distance reference value setter shown in FIG. 6. The end stopping points of the line are designated as S1 and S5. The stopping points S2 to S4 are disposed in-between as required. Between the stopping points S1 and S2 a passenger cabin is indicated in a stylized manner and designated as 69. The passenger cabin moves in the direction of end stopping point S5. This example prevents collisions at critical danger points using switches 70 and 71, respectively, at emergency stopping points W1 and W2. With the travel direction shown, the possibility of a collision situation at the switch 70 must therefore be checked after passing the stopping point S2. If not, an H (high) signal is given as the OK signal so that the emergency stopping point W1 is passed. In contrast, an L (low) value of the OK signal indicates that a stop at point W1. The next emergency stopping point W2 has no significance for the travel direction of the passenger cabin indicated. The release signal OK can be an H (high) signal immediately after passing the requested stopping points S3. The collision test would be carried out similarly in this case and possibly in a passenger cabin located in the line section 72 that moves toward the switch 71.

Figure 8:
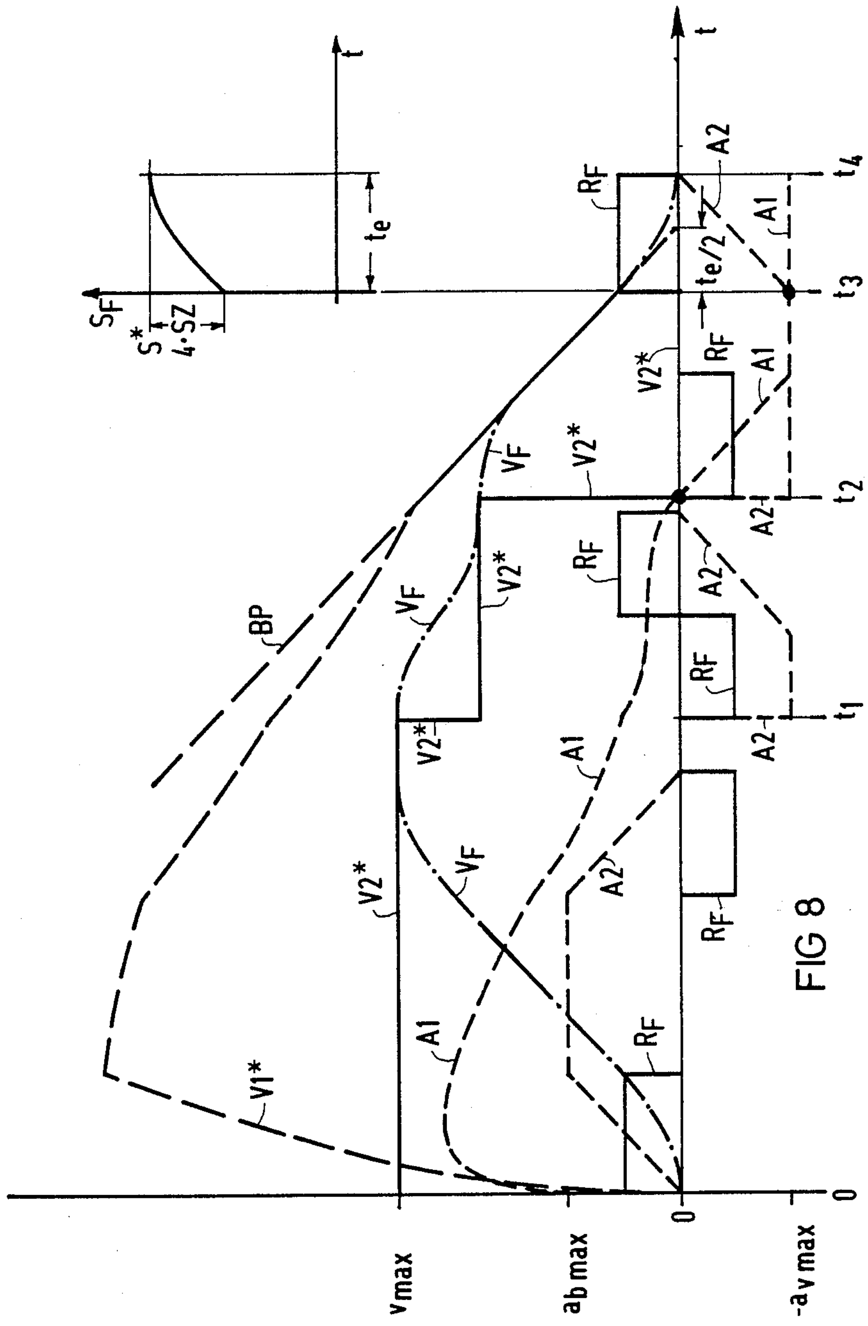
FIGS. 8–10, travel diagrams typical of the method according to the invention.
Figure 9:
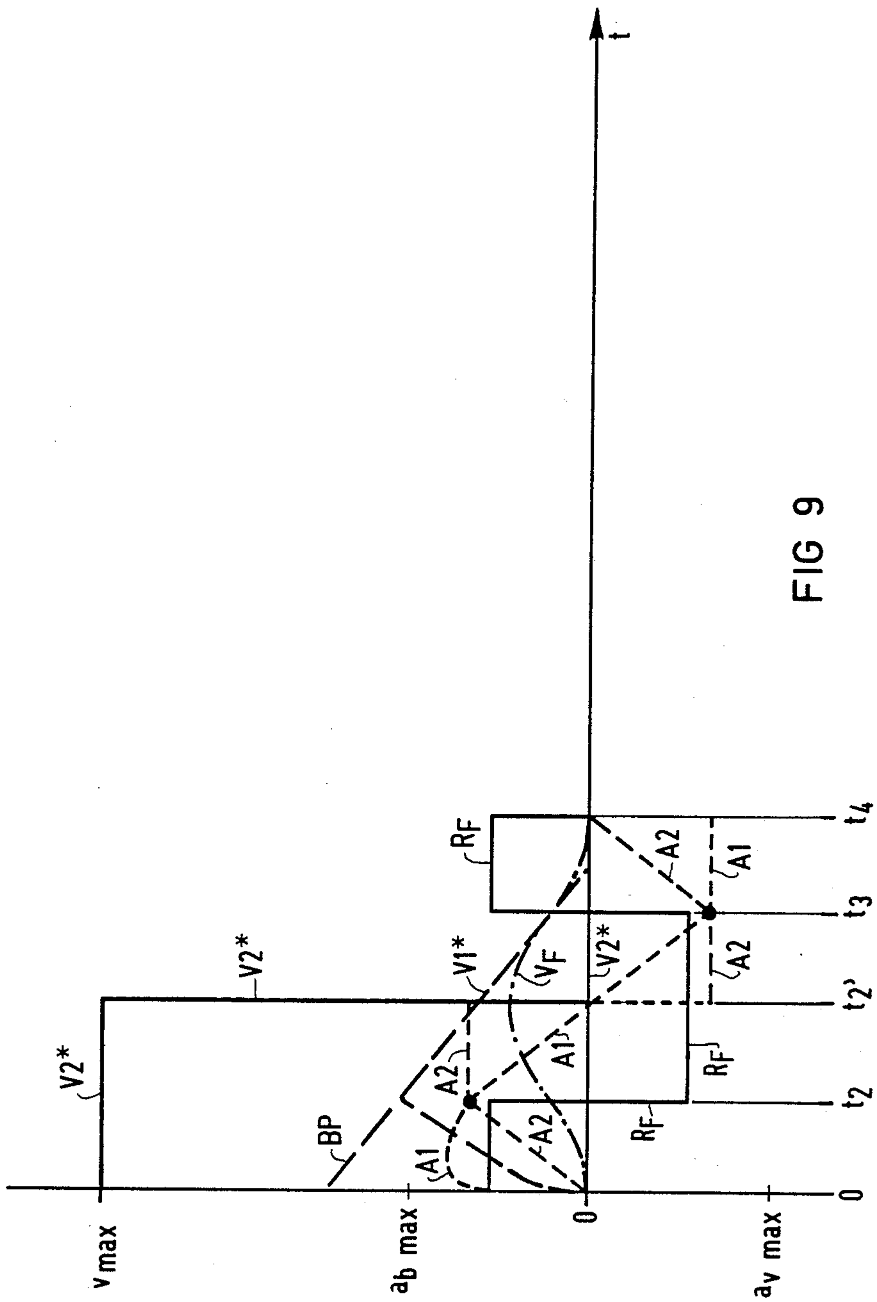
Figure 10:
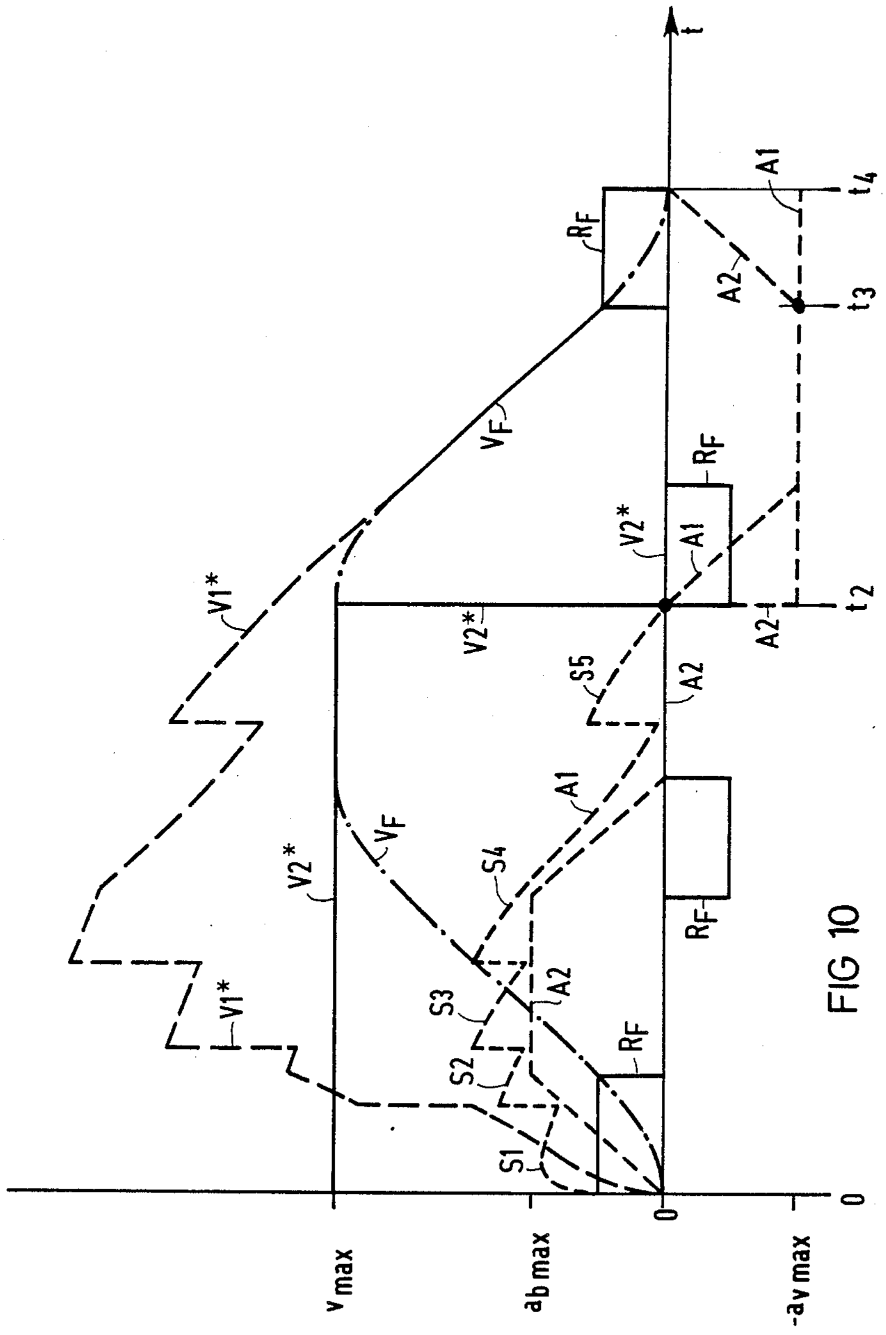

FIGS. 8 to 10 all show typical travel diagrams for the method according to the invention. These figures each depict as a function of time the control led step value RF, the controlled velocity value $V_F$, the velocity reference value V2*, the velocity reference value V1* for the velocity controller 25, 26 as subordinated for the distance controller 22, 23, as well as the two alternative acceleration reference values A1 and A2.

FIG. 8 shows how the positioning drive is first run up from a start with the second alternative acceleration reference value A2 to a velocity V2* which is assumed to correspond to the maximum permissible velocity. Changing the velocity reference value V2* at the time $t_1$ reduces the velocity of the positioning drive PA to any desired intermediate value which could include an "inching" velocity. Until time $t_2$ the positioning drive is controlled by the second alternative acceleration reference value A2 as determined by Equation (7b). The condition according to Equation (7a) is fulfilled from time $t_2$ on. The destination braking under the action of the first alternative acceleration reference value then begins. The controlled velocity reference value $V_F$ is brought into coincidence with the straight line designated under the action of the distance controller described by the Equations (4a) and (4b). Reference value $V_F$ is thus controlled until time $t_3$.

The straight line BP corresponds to a travel distance/velocity diagram having the form of a typical braking parabola. The controlled velocity reference value $V_F$ becomes s smaller than the value $a^2{}_v/2.R_{max}$ at the time $t_3$ so that the value of the second alternative acceleration reference value begins to separate from its limit $-a_{vmax}$ given by Equation (6). The condition given by Equation (7b) is again fulfilled. Thus, the second alternative acceleration reference value A2 relieves the previously active first alternative acceleration reference value A1. The acceleration of the positioning drive is linearly reduced with time to the value zero to obtain the rounded velocity curve of $V_F$. The positioning drive finally comes to rest at the time $t_4$. The distance control deviation S then has a zero value as does the acceleration and the velocity of the positioning drive. If the first alternative acceleration reference value Al were not taken over by the second alternative acceleration reference value A2 from the second alternative acceleration reference value A2, then the positioning drive would attain, with constant deceleration at the time $t_3+t_e/2$, only a point which is located ahead of the provided second point by a distance SZ, where SZ corresponds to the diagram $a_v$. $(24\ R^2{}_{max})^{-1}$. The positioning drive again attains control of the second alternative acceleration value A2 in time for the point in time $t_3$, corresponding to a travel distance, by a factor of four times the stopping point. The positioning drive comes to rest at the time $t_3+t_e$ at the predetermined stopping point ($S_F=S^*$) as indicated in the partial travel distance time diagram shown in FIG. 7.

FIG. 9 shows a travel diagram for "small distances" i.e., for stopping points which are so close to the starting point that the maximum acceleration $a_{bmax}$ is not reached during travel. The destination braking must occur too soon. The positioning drive is again under the action of the second alternative acceleration reference value A2 from the start to the time $t_2$. The destination braking begins from the time $t_2$ under the action of the first alternative acceleration reference value Al. The destination braking is relieved and at the time $t_3$ during the approach to the stopping point using the second alternative acceleration reference value A2. Switching the velocity reference value V2* to zero is required later for the approach to the stopping point. The switching occurs at time $t_2$ and is coupled, according to Equation (5), to the first alternative acceleration reference value A1 that is becoming negative. It is ensured thereby that the condition corresponding to Equation (7a) remains valid after the zero crossing and continues to remain valid before the destination braking occurs with the first alternative acceleration reference value.

FIG. 10 shows the course of travel that is obtained in the embodiment that shifts the step-wise reference value shown in FIG. 6. Sections are indicated by S1 to S5 in the course of the first alternative acceleration reference value A1 and obtained under the action of these reference values. In accord with the example shown in FIG. 6, we have S5>S4>S3>S2>S1. It will be seen that shortly before fulfilling the condition given by Equation (7a) a cross intervention of the first alternative acceleration reference value occurs for the purpose of destination braking. The reference value always increases by one step so that the first alternative acceleration reference value does not become engaged and block the destination braking. Finally, a further increase of the reference value is omitted for the reference value S5. The first alternative acceleration reference value A1 takes control at time $t_2$. However, the omission of the increase from S1 to S2 produces a travel diagram that is substantially the same as shown in FIG. 9.

What is claimed is:

1. A method for providing a stepwise, acceleration and velocity limited travel distance control for a positioning drive having a subordinated velocity control where an acceleration value, a controlled velocity reference value and a distance reference value of the positioning drive are controlled with multiple time integration of a step value, an amplified difference between an acceleration reference value and a time integral of the step value being limited in maximum magnitude to form the step value, comprising the steps of:

forming a first alternative acceleration reference value as a function of a residual travel distance with which the positioning drive would not go beyond a predetermined point that is located at a given travel distance ahead of a predetermined stopping point using constant deceleration;

forming a second alternative acceleration reference value as a function of the controlled velocity reference value with which the positioning drive can be brought to a determinable velocity without overshoot;

limiting the second alternative acceleration reference value between the limits for the acceleration and deceleration as a function of the controlled velocity reference value and a travel direction signal according to the relationship:

$$A2 = \sin(V2^* - FR \cdot V_f) \cdot \sqrt{|V2^* - FR \cdot V_f| \cdot 2 \cdot R_{max}}$$

where $R_{max}$ represents the maximum step value and V2* is a predeterminable velocity value which is set to the value zero when the first alternative acceleration reference value becomes smaller than zero; and selecting with a selection circuit, at each of a number of possible stopping points, either said first or second alternative acceleration reference values according to the following:

using the second alternative acceleration reference value once motion has started;

using the first alternative acceleration reference value to initiate destination braking; and using the second alternative acceleration reference value for approaching the predetermined stopping point if the positioning drive has reached a point that is located four times the value of the given travel distance ahead of the predetermined stopping point.

2. A method as claimed in claim 1, further comprising the steps of:

(a) increasing, from zero, limits on the acceleration and deceleration up to maximum reference values linearly in time;

(b) continuously determining the first alternative acceleration reference value as a function of the residual travel distance, the controlled velocity reference value, the controlled acceleration reference value, the respective limiting reference value for the deceleration and a travel direction signal;

(c) selecting either the first or second alternative acceleration reference value for an acceleration control circuit depending on whether a difference, when weighted with the polarity of the first alternative acceleration reference value, between the first and second alternative acceleration reference values is smaller or greater than zero; and (d) stopping the linear increase with time of the limits for acceleration and deceleration if the first alternative acceleration reference value becomes smaller than the second alternative acceleration reference value.

3. A method as claimed in claim 2, especially for a passenger transport system, further comprising the steps of:

setting the distance reference value in accordance with the nearest stopping point during travel; and increasing the distance reference value as required to obtain a positive first alternative acceleration reference value shortly before the difference between the first alternative acceleration reference value and the second alternative acceleration reference value becomes zero.

4. A method as claimed in claim 3, particularly for roadway bound and track bound unmanned traction drives, further comprising the step of identifying switches, crossings or other danger points as stopping points.

5. An apparatus for providing a stepwise, acceleration and velocity limited travel distance control for a positioning drive having a subordinated velocity control where an acceleration value, a controlled velocity reference value and a distance reference value of the positioning drive are controlled with multiple time integration of a step value, an amplified difference between an acceleration reference value and a time integral of the step value being limited in maximum magnitude to form the step value, comprising:

means for forming a first alternative acceleration reference value as a function of a residual travel distance with which the positioning drive would not go beyond a predetermined point that is located at a given travel distance ahead of a predetermined stopping point using constant deceleration;

means for forming a second alternative acceleration reference value as a function of the controlled velocity reference value with which the positioning drive can be brought to a determinable velocity without overshoot;

means for using the second alternative acceleration reference value once motion has started;

means for using the first alternative acceleration reference value to initiate destination braking;

means for using the second alternative acceleration reference value for approaching the predetermined stopping point if the positioning drive has reached a point that is located four times the value of the given travel distance ahead of the predetermined stopping point;

a double throw switch for selecting either the first or second alternative acceleration value;

an exclusive OR gate for actuating the double through switch; and limit indicators for supplying the exclusive OR gate with the first acceleration reference value and the difference between the first and second acceleration reference values.

6. An apparatus as claimed in claim 5, further comprising:

a root taking function generator for forming the second alternative acceleration reference value;

an absolute value former for supplying an input variable to the root taking function generator; and a minimum value selection circuit connected to an output of said root taking function generator having a second input that is acted upon, depending on the polarity of the input variable of the absolute value former, by a limit signal for the acceleration value or by a limit signal for the deceleration of the output signal of the minimum value selection circuit having the same polarity as the polarity of the input signal of the absolute value former.

7. An apparatus for providing a stepwise, acceleration and velocity limited travel distance control for a positioning drive having a subordinated velocity control where an acceleration value, a controlled velocity reference value and a distance reference value of the positioning drive are controlled with multiple time integration of a step value, an amplified difference between an acceleration reference value and a time integral of the step value being limited with respect to its maximum magnitude being formed as the step value, comnprising:

means for forming a first alternative acceleration reference value as a function of a residual travel distance with which the positioning drive would not go beyond a predetermined stopping point using constant deceleration;

means for forming a second alternative acceleration reference value as a function of the controlled velocity reference value with which the positioning drive can be brought to a determinable velocity without overshoot;

means for using the second alternative acceleration value once motion has started;

means for using the first alternative acceleration reference value to initiate destination braking;

means for using the second alternative acceleration reference value if the positioning drive has reached a point that is located four times the value of the given travel distance ahead of the predetermined stopping point;

means for increasing, from zero, the acceleration and deceleration up to maximum reference values linearly in time;

means for continuously determining the first alternative acceleration reference value as a function of the residual travel distance, the controlled velocity reference value, of the controlled acceleration reference value, the respective limiting reference value for the deceleration and a travel direction signal;

means for limiting the second alternative acceleration reference value between the limits for the acceleration and deceleration as a function of the controlled velocity reference value and of a travel direction signal according to the relationship:

$$A2 = \sin(V2^* - FR \cdot Vf) \cdot \sqrt{|V2^* - FR \cdot Vf| \cdot 2 \cdot R_{max}}$$

where $R_{max}$ is the maximum step value and V2* is a predeterminable velocity value which is set to the value zero when the first alternative acceleration reference value becomes smaller than zero;

means for selecting either the first or second alternative acceleration reference values for an acceleration control circuit depending on whether a difference, when weighted with the polarity of the first alternative acceleration reference, value between the first and second alternative acceleration reference values is smaller or greater than zero;

means for stopping the linear increase with time of the limits for acceleration and deceleration if the first alternative acceleration reference value becomes smaller than the second alternative acceleration reference value;

means for setting the distance reference value in accordance with a stopping point that is nearest during travel;

means for increasing the distance reference value as required to obtain a positive first alternative acceleration reference value shortly before the difference between the first alternative acceleration reference value and the second alternative acceleration reference value becomes zero;

means for activating reference values corresponding to individual stopping points using selection keys and multivibrators;

an extreme value selection circuit having an input connected to said activating means;

a plurality of switches, each switch being connected to actuate individual cells of a shift register;

means for reading out the values stored in the shift register in sequence; and means for stepping said shift register if, during upward travel, the extreme value selection circuit reads out reference values, the smallest of which is larger than the then current reference value or, during downward travel, stepping said shift register if said extreme value selection reads out a reference value, the larger value of which is smaller than the then current reference value.

8. An apparatus as claimed in claim 7, wherein the extreme value selection circuit contains diodes which are connected to each other at the cathode or the anode side, respectively.

* * * * *